(12) United States Patent
Hanson

(10) Patent No.: US 11,444,809 B2
(45) Date of Patent: Sep. 13, 2022

(54) UPLINK SIGNAL COMBINERS FOR MOBILE RADIO SIGNAL DISTRIBUTION SYSTEMS USING ETHERNET DATA NETWORKS

(71) Applicant: Andrew Wireless Systems GmbH, Buchdorf (DE)

(72) Inventor: Van E. Hanson, Forest, VA (US)

(73) Assignee: Andrew Wireless Systems GmbH, Buchdorf (DE)

( * ) Notice: Subject to any disclaimer, the term of this patent is extended or adjusted under 35 U.S.C. 154(b) by 0 days.

(21) Appl. No.: 15/567,047

(22) PCT Filed: Apr. 15, 2016

(86) PCT No.: PCT/US2016/027829
§ 371 (c)(1),
(2) Date: Oct. 16, 2017

(87) PCT Pub. No.: WO2016/168651
PCT Pub. Date: Oct. 20, 2016

(65) Prior Publication Data
US 2018/0097659 A1    Apr. 5, 2018

Related U.S. Application Data

(60) Provisional application No. 62/148,281, filed on Apr. 16, 2015.

(51) Int. Cl.
*H04L 12/54* (2022.01)
*H04W 88/08* (2009.01)
(Continued)

(52) U.S. Cl.
CPC ........ *H04L 12/5601* (2013.01); *H04L 49/351* (2013.01); *H04W 88/085* (2013.01);
(Continued)

(58) Field of Classification Search
None
See application file for complete search history.

(56) References Cited

U.S. PATENT DOCUMENTS 6,496,478 B1 * 12/2002 Choi ............... H04L 47/30
370/413
6,704,545 B1 * 3/2004 Wala ............... H04W 4/14
370/907

(Continued)

FOREIGN PATENT DOCUMENTS

CN     1201353 A    12/1998
CN   101431470 A     5/2009
(Continued)

OTHER PUBLICATIONS

European Patent Office, "Extended European Search Report from EP Application No. 16780871.6 dated Oct. 10, 2018", from Foreign Counterpart to PCT Application No. PCT/US2016/027829, Oct. 10, 2018, pp. 1-8, Published: EP.

(Continued)

*Primary Examiner* — Christopher T Wyllie
(74) *Attorney, Agent, or Firm* — Fogg & Powers LLC

(57) ABSTRACT

One embodiment is directed to an uplink signal combiner that is configured to receive, via the data network, data packets from the remote antenna units. Each of the data packets includes respective control data and respective user data. The respective control data include data for managing a communication link between a baseband unit and a respective remote antenna unit. The respective user data represents a respective uplink signal received by each of the remote antenna units from one or more mobile stations. The uplink signal combiner is configured to generate additional user data representing a first combined uplink signal by combining the user data extracted from the data packets. The uplink signal combiner is configured to transmit an additional data (Continued)

packet to the baseband unit. The additional data packet includes the additional user data and additional control data derived from the control data from the received data packets.

31 Claims, 6 Drawing Sheets

(51) Int. Cl.
*H04L 49/351* (2022.01)
*H04L 12/70* (2013.01)

(52) U.S. Cl.
CPC .............. *H04L 2012/5605* (2013.01); *H04L 2012/5607* (2013.01); *H04L 2012/5624* (2013.01); *H04L 2012/5665* (2013.01)

(56) References Cited

U.S. PATENT DOCUMENTS

| | | | |
|---|---|---|---|
| 6,889,257 B1* | 5/2005 | Patel | H04N 21/2662 709/233 |
| 7,088,782 B2 | 8/2006 | Mody et al. | |
| 7,120,201 B2 | 10/2006 | Huang et al. | |
| 7,706,458 B2 | 4/2010 | Mody et al. | |
| 7,715,879 B2 | 5/2010 | Nakao | |
| 7,826,555 B2 | 11/2010 | Murakami et al. | |
| 7,920,881 B2 | 4/2011 | Fullam | |
| 7,929,487 B2 | 4/2011 | Van Wijngaarden et al. | |
| 8,005,165 B2 | 8/2011 | Murakami et al. | |
| 8,194,597 B2 | 6/2012 | Feder et al. | |
| 8,254,865 B2 | 8/2012 | Soul et al. | |
| 8,326,365 B2 | 12/2012 | Richardson et al. | |
| 8,412,244 B2 | 4/2013 | Bowen et al. | |
| 8,654,796 B2 | 2/2014 | Xiang et al. | |
| 8,666,428 B2 | 3/2014 | Ma et al. | |
| 8,681,905 B2 | 3/2014 | Miyanaga et al. | |
| 9,019,841 B2 | 4/2015 | Tavildar et al. | |
| 9,071,290 B2 | 6/2015 | Oesterling et al. | |
| 10,348,394 B1* | 7/2019 | Bakr | H04L 5/14 |
| 2002/0032788 A1* | 3/2002 | Emanuel | H04L 47/24 709/225 |
| 2003/0093550 A1* | 5/2003 | Lebizay | H04L 12/5601 709/236 |
| 2003/0119442 A1* | 6/2003 | Kwak | H04W 88/021 455/462 |
| 2003/0147393 A1* | 8/2003 | Stewart | H04L 45/50 370/392 |
| 2004/0052305 A1* | 3/2004 | Olson | H04B 1/7117 375/285 |
| 2004/0136385 A1* | 7/2004 | Xue | H04Q 11/0005 370/389 |
| 2004/0205461 A1* | 10/2004 | Kaufman | G06F 40/258 715/255 |
| 2004/0264472 A1* | 12/2004 | Oliver | H04L 49/50 370/395.4 |
| 2005/0157675 A1* | 7/2005 | Feder | H04W 16/26 370/328 |
| 2006/0133279 A1* | 6/2006 | Le Faucheur | H04L 47/41 370/235 |
| 2006/0209752 A1* | 9/2006 | Wijngaarden | H04W 28/06 370/328 |
| 2006/0239188 A1* | 10/2006 | Weiss | H04L 47/52 370/468 |
| 2007/0201440 A1* | 8/2007 | Ganguly | H04L 29/06027 370/356 |
| 2007/0211625 A1* | 9/2007 | Liu | H04L 47/283 370/431 |
| 2007/0223472 A1* | 9/2007 | Tachibana | H04L 47/10 370/473 |
| 2007/0286149 A1* | 12/2007 | Yamamoto | H04W 72/1263 370/345 |
| 2008/0025343 A1* | 1/2008 | Rangel | H04L 67/04 370/469 |
| 2008/0159264 A1* | 7/2008 | Fleming | H04L 12/66 370/352 |
| 2008/0165715 A1* | 7/2008 | Liu | H04W 52/0229 370/311 |
| 2008/0279219 A1* | 11/2008 | Wu | H04L 45/00 370/474 |
| 2009/0061771 A1* | 3/2009 | Ma | H04B 7/2606 455/500 |
| 2009/0122745 A1 | 5/2009 | Fahldieck | |
| 2009/0201898 A1* | 8/2009 | Gong | H04W 28/06 370/338 |
| 2010/0054237 A1 | 3/2010 | Han et al. | |
| 2010/0296816 A1* | 11/2010 | Larsen | H04B 10/25754 398/116 |
| 2011/0194854 A1* | 8/2011 | Freire | H04J 3/1694 398/58 |
| 2011/0216816 A1 | 9/2011 | Frenzel | |
| 2012/0002967 A1 | 1/2012 | Mayer et al. | |
| 2012/0014422 A1 | 1/2012 | Wegener | |
| 2012/0026998 A1* | 2/2012 | O'Keeffe | H04B 7/086 370/338 |
| 2012/0113883 A1 | 5/2012 | Österling | |
| 2012/0114050 A1 | 5/2012 | Österling | |
| 2012/0163299 A1* | 6/2012 | Chen | H04W 56/004 370/328 |
| 2012/0189074 A1* | 7/2012 | Jin | H04B 7/024 375/267 |
| 2012/0257516 A1* | 10/2012 | Pazhyannur | H04B 7/0845 370/252 |
| 2013/0083780 A1 | 4/2013 | Luo et al. | |
| 2013/0095870 A1* | 4/2013 | Phillips | H04W 52/46 455/501 |
| 2013/0132788 A1 | 5/2013 | Braun et al. | |
| 2013/0195000 A1 | 8/2013 | Shen et al. | |
| 2013/0195048 A1* | 8/2013 | Ekpenyong | H04W 74/0833 370/329 |
| 2014/0106770 A1 | 4/2014 | Valentin et al. | |
| 2014/0204854 A1 | 7/2014 | Freda et al. | |
| 2014/0213285 A1 | 7/2014 | Sauer | |
| 2014/0269603 A1 | 9/2014 | Aminaka et al. | |
| 2014/0314002 A1 | 10/2014 | Hanson et al. | |
| 2014/0328184 A1 | 11/2014 | Aminaka et al. | |
| 2014/0334417 A1 | 11/2014 | Aminaka et al. | |
| 2015/0029965 A1 | 1/2015 | Aminaka et al. | |
| 2015/0043756 A1* | 2/2015 | Ojanpera | H04R 3/00 381/119 |
| 2015/0138983 A1* | 5/2015 | Williams | H04L 47/193 370/235 |
| 2015/0372728 A1* | 12/2015 | Rahman | H04B 7/0456 370/329 |
| 2016/0227462 A1* | 8/2016 | Axmon | H04B 7/0842 |
| 2016/0269961 A1* | 9/2016 | Imana | H04W 36/28 |
| 2016/0277964 A1* | 9/2016 | Xu | H04W 88/085 |
| 2017/0033842 A1* | 2/2017 | Lu | G01S 5/0036 |
| 2017/0070975 A1* | 3/2017 | Ranson | H04W 72/005 |
| 2017/0163342 A1* | 6/2017 | Testa | H04Q 11/0003 |
| 2018/0007736 A1* | 1/2018 | Ruttik | H04J 3/0661 |
| 2018/0048402 A1* | 2/2018 | Schmidt, Jr. | H04B 17/14 |
| 2018/0097659 A1* | 4/2018 | Hanson | H04L 12/5601 |
| 2018/0375721 A1* | 12/2018 | Rondeau | H04L 41/0806 |
| 2019/0191318 A1* | 6/2019 | Jovanovic | H04W 24/02 |
| 2020/0076567 A1* | 3/2020 | Wala | H04W 56/001 |
| 2021/0051765 A1* | 2/2021 | Rosenschild | H04B 7/022 |
| 2021/0099208 A1* | 4/2021 | Krieger | H04W 72/0413 |

FOREIGN PATENT DOCUMENTS

| | | |
|---|---|---|
| CN | 102037694 A | 4/2011 |
| EP | 2611229 A1 | 7/2013 |
| WO | 2014070236 A1 | 5/2014 |
| WO | WO-2019157525 A1 * | 8/2019 ............ G06F 1/28 |

OTHER PUBLICATIONS

European Patent Office, "Communication pursuant to Article 94(3) from EP Application No. 16780871.6", from Foreign Counterpart to

(56) References Cited

OTHER PUBLICATIONS

U.S. Appl. No. 15/567,047, dated Dec. 17, 2019, pp. 1-6, Published: EP.
International Searching Authority (IB), "Preliminary Report on Patentability for PCT Application No. PCT/US2016/027829", Foreign Counterpart to U.S. Appl. No. 15/567,047, dated Oct. 26, 2017, pp. 1-9, Published in: U.S.
International Searching Authority, "International Search Report and Written Opinion for PCT Application No. PCT/US2016/027829", Foreign Counterpart to U.S. Appl. No. 15/567,047, dated Jul. 8, 2016, pp. 1-12, Published in: U.S.
China National Intellectual Property Administration, "Second Office Action from CN Application 201680017494.1", from Foreign Counterpart to U.S. Appl. No. 15/567,047, dated May 27, 2020, pp. 1 through 14, Published: CN.
China National Intellectual Property Administration, "First Office Action from CN Application No. 201680017494.1", from Foreign Counterpart to U.S. Appl. No. 15/567,047, dated Nov. 28, 2019, pp. 1-12, Published: CN.
European Patent Office, "Communication pursuant to Article 94(3) EPC from EP Application No. 16780871.6", from Foreign Counterpart to U.S. Appl. No. 15/567,047, dated Feb. 17, 2021, pp. 1 through 6, Published: EP.
China National Intellectual Property Administration, "Rejection Decision from CN Application No. 201680017494.1", from Foreign Counterpart to U.S. Appl. No. 15/567,047, dated Dec. 2, 2020, pp. 1 through 15, Published: CN.
Jungnickel et al., "Synchronization of Cooperative Base Stations", IEEE International Symposium on Wireless Communication Systems, 2008, pp. 1-6, IEEE.
Mody et al., "Synchronization for MIMO OFDM Systems", 2001, pp. 509-513, IEEE.
Sharif et al., "A Comparison of Time-Sharing, DPC, and Beamforming for MIMO Broadcast Channels With Many Users", IEEE Transactions on Communications, Jan. 2007, pp. 11-15, vol. 55, No. 1, IEEE.
Shirani-Mehr et al., "MIMO Downlink Scheduling with Non-Perfect Channel State Knowledge", Ming Hsieh Department of Electrical Engineering, Jul. 9, 2009, pp. 1-30, University of Southern California.
Spencer et al., "An Introduction for the Multi-User MIMO Downlink", IEEE Communications Magazine, Oct. 2004, pp. 60-67, IEEE.
China National Intellectual Property Administration, "Notice of Reexamination from CN Application No. 201680017494.1", from Foreign Counterpart to U.S. Appl. No. 15/567,047, dated Jul. 21, 2021, pp. 1 through 21, Published: CN.
China National Intellectual Property Administration, "Board Decision (No. 1F378292)", from CN Application No. 201680017494.1 dated Dec. 30, 2021, from Foreign Counterpart to U.S. Appl. No. 15/567,047, pp. 1 through 27, Published: CN.

* cited by examiner

UPLINK SIGNAL COMBINERS FOR MOBILE RADIO SIGNAL DISTRIBUTION SYSTEMS USING ETHERNET DATA NETWORKS

CROSS-REFERENCE TO RELATED APPLICATIONS

This application is a U.S. National Stage application of PCT Application Serial No. PCT/US2016/027829, filed 15 Apr. 2016 and titled "UPLINK SIGNAL COMBINERS FOR MOBILE RADIO SIGNAL DISTRIBUTION SYSTEMS USING ETHERNET DATA NETWORKS," which claims the benefit of U.S. Provisional Application Ser. No. 62/148,281, filed 16 Apr. 2015 and titled "UPLINK SIGNAL COMBINERS FOR MOBILE RADIO SIGNAL DISTRIBUTION SYSTEMS USING ETHERNET DATA NETWORKS," the contents of all of which are incorporated herein by reference.

BACKGROUND

This disclosure describes a method and system for combining uplink signals from multiple remote radio heads ("RRHs") in a mobile radio signal distribution system ("MRSDS"). An example of a MRSDS is a telecommunication system in which a base station or other baseband unit ("BBU") communicates with mobile stations or other user equipment via RRHs. The base station or BBU communicates with the core network of a wireless service provider.

SUMMARY

One embodiment is directed to a method. The method comprises receiving, via a data network, first data packets from first remote antenna units. Each of the first data packets includes respective first control data and respective first user data. The respective first control data include data for managing a first communication link between a first baseband unit and a respective first remote antenna unit. The respective first user data represents a respective first uplink signal received by each of the first remote antenna units from one or more mobile stations. The method further comprises extracting the first user data from the received first data packets, generating first additional user data representing a first combined uplink signal by combining the first user data extracted from the first data packets, and transmitting a first additional data packet to the first baseband unit. The first additional data packet includes the first additional user data and first additional control data derived from the first control data from the received first data packets.

Another embodiment is directed to an uplink signal combiner for use with multiple first remote antenna units and a first baseband unit. The uplink signal combiner comprises at least one network interface to couple the uplink signal combiner to a data network in order to couple the uplink signal combiner to the first baseband unit and the first remote antenna units. The uplink signal combiner is configured to receive, via the data network, first data packets from the first remote antenna units. Each of the first data packets includes respective first control data and respective first user data. The respective first control data include data for managing a first communication link between a first baseband unit and a respective first remote antenna unit. The respective first user data represents a respective first uplink signal received by each of the first remote antenna units from one or more mobile stations. The uplink signal combiner is configured to extract the first user data from the received first data packets and generate first additional user data representing a first combined uplink signal by combining the first user data extracted from the first data packets. The uplink signal combiner is configured to transmit a first additional data packet to the first baseband unit. The first additional data packet includes the first additional user data and first additional control data derived from the first control data from the received first data packets.

Another embodiment is directed to a system comprising an uplink signal combiner and a plurality of first remote antenna units configured to communicate with a first baseband unit. The uplink signal combiner comprises at least one network interface to couple the uplink signal combiner to a data network in order to couple the uplink signal combiner to the first baseband unit and the first remote antenna units. The uplink signal combiner is configured to receive, via the data network, first data packets from the first remote antenna units, wherein each of the first data packets includes respective first control data and respective first user data. The respective first control data include data for managing a first communication link between a first baseband unit and a respective first remote antenna unit. The respective first user data represents a respective first uplink signal received by each of the first remote antenna units from one or more mobile stations. The uplink signal combiner is configured to extract the first user data from the received first data packets and generate first additional user data representing a first combined uplink signal by combining the first user data extracted from the first data packets. The uplink signal combiner is configured to transmit a first additional data packet to the first baseband unit. The first additional data packet includes the first additional user data and first additional control data derived from the first control data from the received first data packets.

DRAWINGS

DETAILED DESCRIPTION

Figure 1:
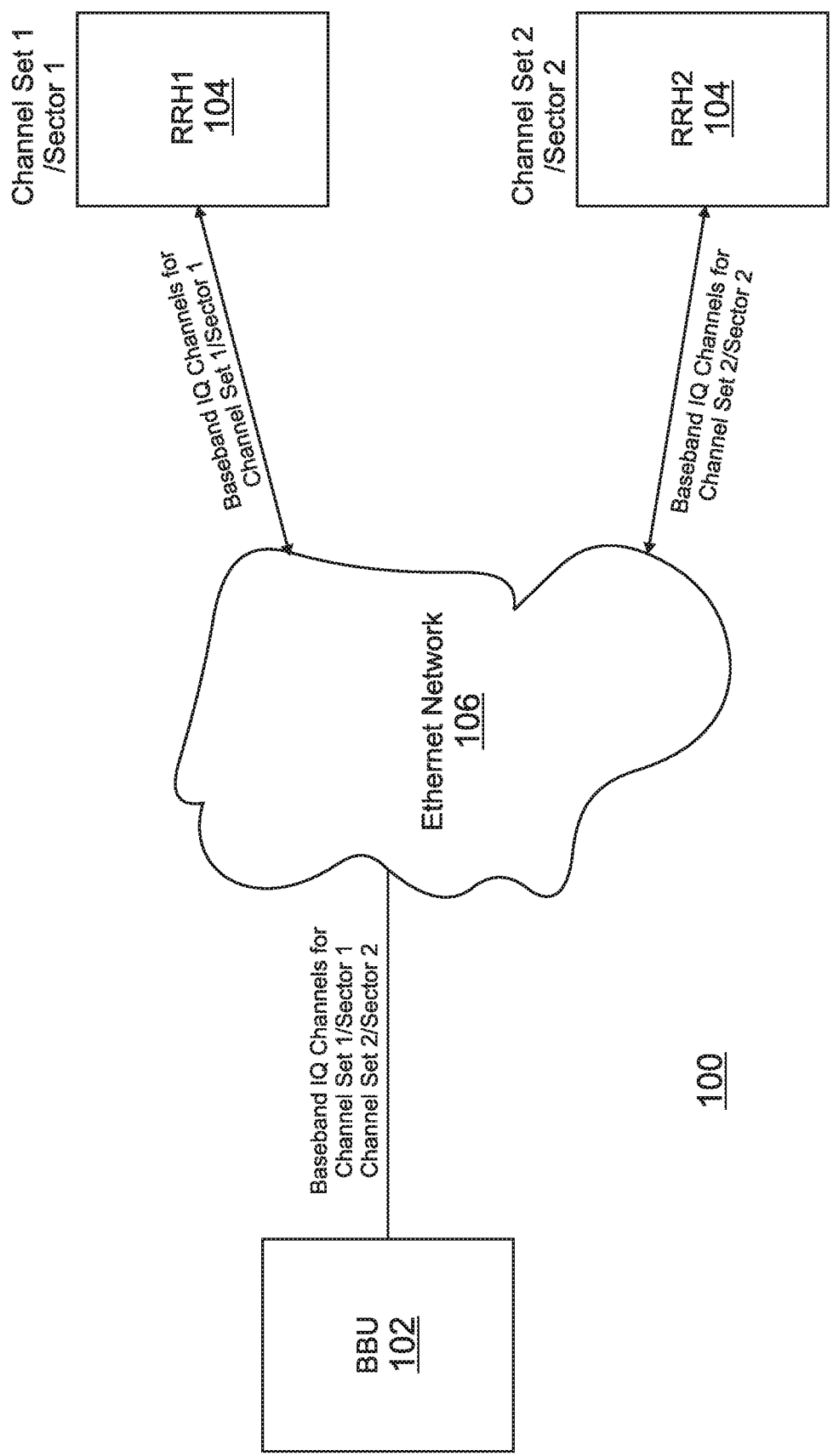
FIG. 1 depicts an example of a non-simulcast MRSDS.

In some aspects, an uplink signal combiner can communicate with one or more BBUs and multiple RRHs or other remote antenna units via an Ethernet data network. The uplink signal combiner can receive data packets from the RRHs. Each data packet can include control data and user data (for example, digital IQ samples). The user data from different RRHs can represent one or more uplink signals that have been received by multiple RRHs (e.g., an uplink signal received by multiple RRHs from the same mobile station).

The control data can be used for managing communication links between BBUs and RRHs. The uplink signal combiner can extract the user data from the received data packets and generate additional user data that represents a combined uplink signal. The combined uplink data can be generated by adding or otherwise combining the user data that is extracted from the data packets received from the RRHs (for example, by adding together corresponding digital IQ samples received from different RRHs). The uplink signal combiner can generate additional data packets that include the generated user data representing the combined uplink signal and the control data received from the RRHs. The uplink signal combiner can transmit the generated data packets to the BBUs.

The uplink signal combiner described herein can provide an uplink combination feature that is not available in standard Ethernet networks and equipment. For example, signals may be simulcast from multiple RRHs via a particular channel or group of channels. In the downlink direction, the same downlink signals can be broadcast to multiple RRHs using multicast IP protocols. However, in the uplink direction, the uplink signals received by each RRH that operates in the same sector and transmits the same channels can be combined into a composite signal to be transmitted to the BBU.

The operation of the uplink signal combiner can allow multiple data streams from RRHs to be consolidated into one data stream for transmission to a BBU. Consolidating multiple data streams from RRHs into one data stream for transmission can increase the efficiency with which bandwidth is used in an Ethernet or other data network that communicatively couples BBUs and RRHs or other remote antenna units.

Standard data networks and data networking equipment can be used to communicate mobile radio information between BBUs and RRHs. For example, digitized baseband channels or digitized bandwidth containing multiple channels can be used to communicate user data and control information between the BBU and RRH. Downlink signals can be transmitted to the RRH for wireless transmission to mobile stations or other user equipment. Uplink signals can be received by the RRH from mobile devices or other user equipment and transmitted from the RRH to the BBU.

An RRH can include one or more devices that can receive a complex signal from the BBU or other similar devices. An example of a complex digital signal is a digital IQ signal having data for an in-phase ("I") component and a quadrature ("Q") component. The complex signal can be a baseband signal.

In one example, the BBU receives, from a wireless service provider's core network, data to be communicated to one or more mobile stations or other user equipment (for example, voice or non-voice data). The BBU generates downlink baseband data (typically in the form of digital IQ samples) for one or more channels to be communicated to one or more mobile stations. The downlink baseband data (also referred to here as a "user data") is combined with control data and communicated to one or more RRHs. Each RRH generates a downlink analog RF signal from the user data communicated to it. In one example, each RRH extracts the digital IQ samples, digitally up-converts the digital IQ samples to produce real digital samples, performs a digital-to-analog process on the real samples in order to produce an intermediate frequency (IF) or baseband analog signal, and up-converts the IF or baseband analog signal to the desired RF frequency. Alternatively, the signal could be converted directly to a RF frequency. The digital IQ samples can also be filtered, amplified, attenuated, and/or re-sampled or interpolated to a higher sample rate. The analog signal can be produced in other ways (for example, where the digital IQ samples are provided to a quadrature digital-to-analog converter that directly produces the analog IF or baseband signal). The downlink analog RF signal is radiated from one or more antennas associated with that RRH for reception by the mobile stations or other user equipment.

The RRH can wirelessly receive RF signals from mobile stations or other user equipment via one or more antennas associated with the RRH, convert the received signals to baseband signals, and transmit the baseband uplink signals to one or more BBUs. In some aspects, the received signals can be converted to baseband signals as individual channels. In additional or alternative aspects, the received signals can be converted to baseband signals as multiple channels within a frequency band. The RRH can transmit the baseband signals to the BBU.

In one example, this uplink baseband data representing one or more uplink analog RF signals comprises digital IQ samples. The RRH produces the uplink digital IQ samples from one or more uplink analog RF signals received by the RRH by down-converting the received signal to an intermediate frequency (IF) or to baseband, digitizing the down-converted signal to produce real digital samples, and digitally down-converting the real digital samples to produce digital IQ samples. These uplink digital IQ samples can also be filtered, amplified, attenuated, and/or re-sampled or decimated to a lower sample rate. The digital samples can be produced in other ways. The uplink user data (that is, the digital IQ samples in this example) and control data are communicated to the BBU, which uses the user data for baseband processing it performs.

Packetized data representing baseband signals transmitted by the RRH can be communicated between the BBU and RRH using Ethernet networks. In some aspects, Ethernet data packets can encapsulate telecommunication packets, such as packets formatted according to the Common Public Radio Interface ("CPRI") protocol. The CPRI protocol can be used to communicate packetized data between BBUs and RRHs. Encapsulating a CPRI packet within an Ethernet packet can include generating an Ethernet packet that in which the Ethernet payload data includes the CPRI packet. This process can utilize widely available Ethernet network and equipment, which may reduce the expense associated with using specialized equipment for transmitting packetized CPRI data between BBUs and RRHs.

For illustrative purposes, this disclosure describes the use of packetized CPRI data. However, an uplink signal combiner can be used to combine IQ data or other user plane data that is transported using any suitable standardized telecommunication protocol, such as the Open Radio Equipment Interface ("ORI") protocol, the Open Base Station Standard Initiative ("OBSAI") protocol, etc. Additionally or alternatively, the uplink signal combiner can be used to combine IQ data or other user plane data that is transported using proprietary telecommunication protocols.

FIG. 1 depicts an example of a non-simulcast MRSDS 100. In the example depicted in FIG. 1, one BBU 102 communicates with multiple RRHs or other remote antenna units 104. In some aspects, each RRH 104 can operate on different channels. In additional or alternative aspects, the RRHs can be used on the same channel and operate as unique sectors. The BBU transmits downlink baseband IQ data to each RRH. Each RRH transmits uplink IQ baseband data to the BBU. Standard point-to-point Ethernet protocols between the BBUs and RRHs can be used to implement this communication (shown in FIG. 1 as Ethernet network 106).

Figure 2:
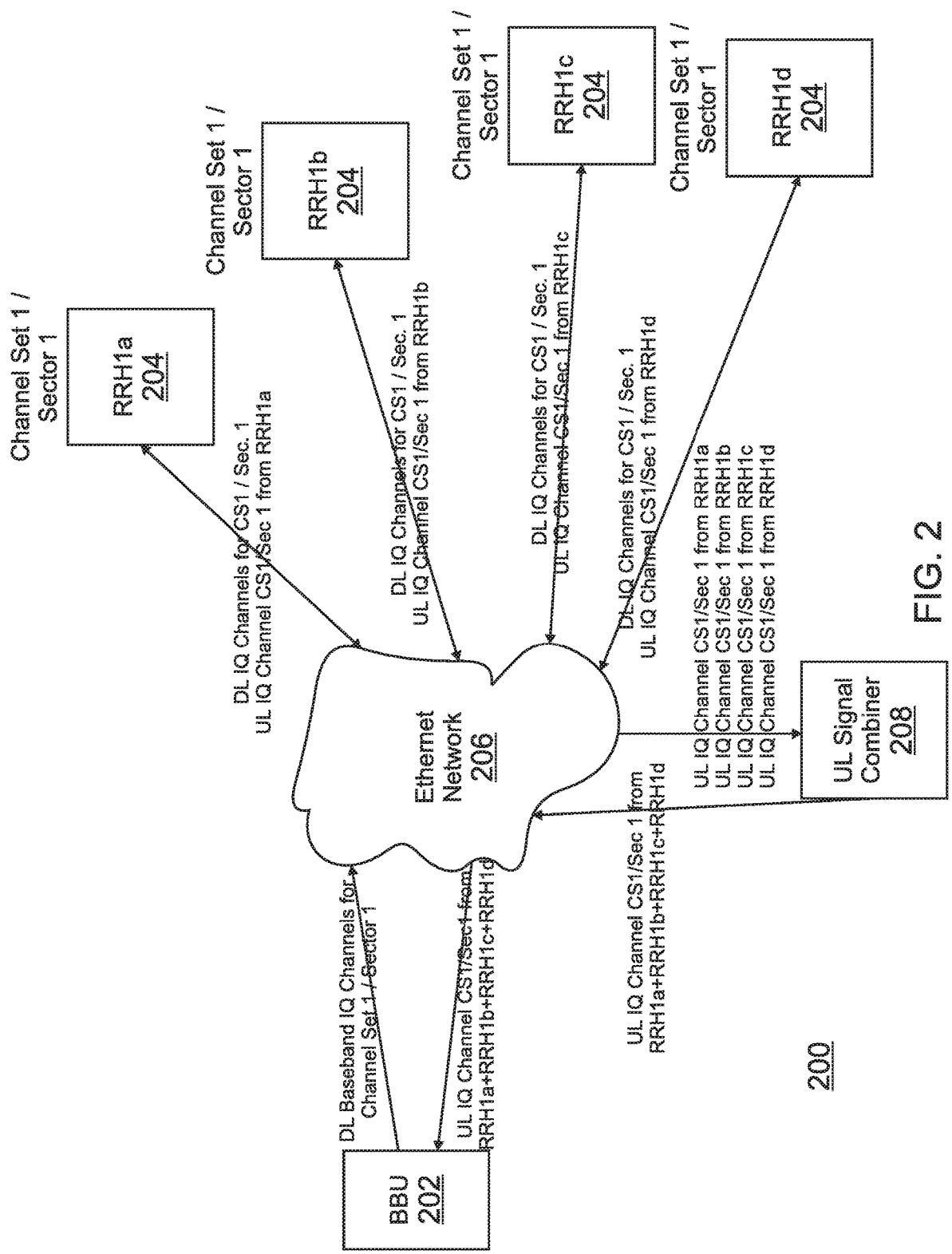
FIG. 2 depicts an example of a simulcast MRSDS.

FIG. 2 depicts an example of a simulcast MRSDS 200. In the example depicted in FIG. 2, each BBU 202 can transmit identical downlink IQ signals to four different RRHs or other remote antenna units 204 over an Ethernet 206. The downlink signals are transmitted by the RRH 204 for reception by any mobile stations or other user equipment within the coverage area of that RRH. In the uplink direction, each RRH receives uplink signals via the corresponding uplink channels and generates user data that represents the received uplink signals (for example, in the form of digital IQ samples of the type described above). The user data representing these uplinks signals from two or more of the RRHs 204 can be combined into a composite signal prior to being sent to the BBU.

An uplink signal combiner 208 is used to combine the user data representing the uplink signals from two or more RRHs 204. The uplink signal combiner 208 can be configured with any suitable interface used to communicate Ethernet traffic. Uplink traffic from the RRHs 204 can be routed through the Ethernet network 206 to the uplink signal combiner 208. The uplink signal combiner 208 can be configured by the BBU 202 to generate a composite uplink signal add or otherwise combine baseband signals that are received from the RRHs 204 and that include signals occupying a common spectrum. The uplink signal combiner 208 can transmit the composite uplink signal to the BBU 202 via the Ethernet network 206.

For instance, multiple RRHs 204 may transmit packetized data formatted according to an Ethernet protocol. The packetized data may include encapsulated CPRI frames that are encapsulated within the Ethernet frames. The uplink signal combiner 208 can extract CPRI IQ data from the packetized data received from multiple RRHs 204. The uplink signal combiner 208 can add or otherwise combine the extracted CPRI IQ data (for example, by adding together corresponding digital IQ samples from each of the RRHs 204). The uplink signal combiner 208 can format the combined data into one or more Ethernet frames along with the CPRI control messages. In some aspects, the CPRI control messages may be unchanged by the combination process. Thus, the uplink signal combiner 208 can output an Ethernet frame that includes combined IQ data from multiple RRHs 204 and the same control data received from the RRHs 204. In additional or alternative aspects, the CPRI control messages may be modified by the uplink signal combiner 208. For example, the uplink signal combiner 208 can generate new control data from the CPRI control messages such that the BBU 202 treats the uplink signal combiner 208 as the logical endpoint of a CPRI communication link. In this scenario, the uplink signal combiner 208 can manage communication links with respective RRHs 204 on behalf of the BBU 202.

Figure 3:
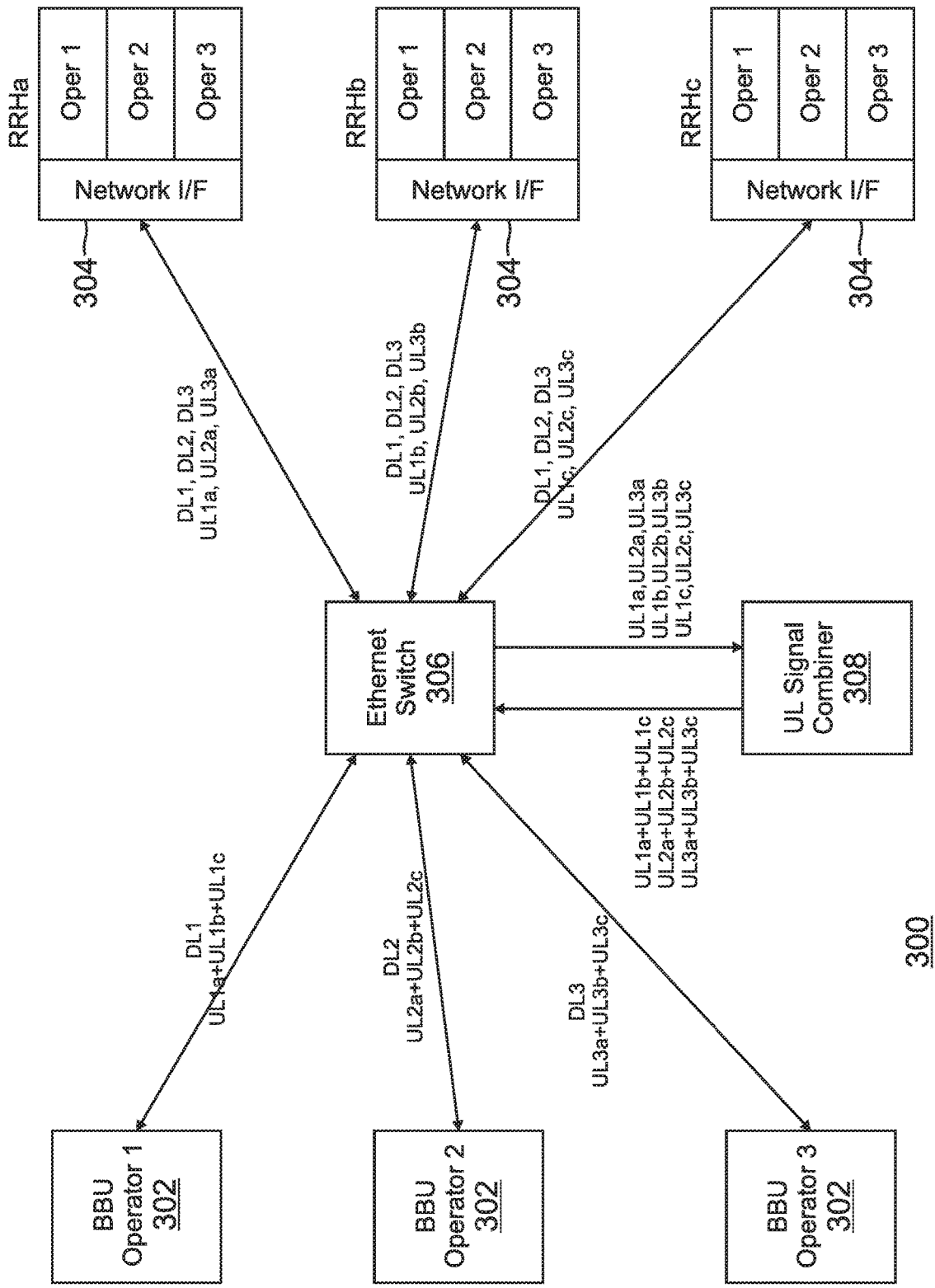
FIG. 3 depicts an example of a multi-operator simulcast system.

FIG. 3 depicts an example of a multi-operator simulcast system 300. In the example depicted in FIG. 3, there are three BBUs 302 controlled by three different telecommunication operators (e.g., different service providers). Each of the BBUs 302 can operate in a unique spectral space (e.g., using a unique set of frequency resources). The downlink signals from each BBU 302 can be simulcast by three different RRHs or other remote antenna units 304. Each operator's BBU 302 transmits respective downlink signals to an Ethernet switch 306. The Ethernet switch 306 can broadcast the respective downlink signals from each BBU 302 to three different RRHs 304. The downlink signals may be baseband signals (for example, digital IQ samples of the type described above). Each RRH 304 can frequency convert the baseband signals received from the Ethernet switch into RF signals. Each RRH 304 can wirelessly transmit the frequency-converted RF signals to mobile stations or other use equipment.

In the uplink direction, each RRH 304 can receive signals in a given uplink spectrum corresponding to a respective telecommunication operator. Each RRH 304 does this for each of the three operators depicted in FIG. 3. For each operator, each RRH 304 can convert the received one or more uplink signals for that operator to baseband (for example, digital IQ samples of the type described above). The RRHs 304 can transmit the uplink signals for each operator (for example, as Ethernet packets encapsulating CPRI frames containing the digital IQ samples representing the uplink signals for that operator) to the Ethernet switch 306. The Ethernet switch 306 can transmit the uplink signals to the uplink signal combiner 308. The uplink signal combiner 308 can generate three uplink composite signals, one for each of the operators. Each of the three uplink composite signals can be generated from a respective set of uplink signals for a given operator and can be, for example, in the form of Ethernet packets encapsulating CPRI frames containing combined digital IQ samples representing the uplink signals for that operator.

For example, in one example, the uplink signal combiner 308 receives from each RRH 304 Ethernet packets encapsulating CPRI frames for each operator. The encapsulated CPRI frames for each operator contain uplink digital IQ samples for the one or more uplink signals received at each RRH 304 for that operator. For each operator, the uplink signal combiner 308 can extract the uplink digital IQ samples from the encapsulated CPRI frames received from the multiple RRHs 304 for that operator. The uplink signal combiner 308 can add or otherwise combine the extracted digital IQ samples (for example, by adding together corresponding digital IQ samples from each of the RRHs 304). For each operator, the uplink signal combiner 308 can format the combined data for that operator into one or more CPRI frames encapsulated within Ethernet frames along with the CPRI control messages. In some aspects, the CPRI control messages may be unchanged by the combination process. Thus, the uplink signal combiner 308 can output Ethernet frames for each operator that includes the combined IQ data for that operator from multiple RRHs 304 and the same control data received from the RRHs 304. The Ethernet frames for each operator are communicated from the uplink signal combiner 308 to the appropriate BBU 302 for that operator via the Ethernet switch 306. In additional or alternative aspects, the CPRI control messages may be modified by the uplink signal combiner 308. For example, the uplink signal combiner 308 can generate new control data from the CPRI control messages such that the BBU 302 for each operator treats the uplink signal combiner 308 as the logical endpoint of a CPRI communication link for that operator. In this scenario, the uplink signal combiner 308 can manage communication links with respective RRHs 304 on behalf of the BBU 302.

Although FIGS. 1-3 depict the uplink signal combiner as a single device, other implementations are possible. In some aspects, the uplink combination operations can be performed in a distributed manner by multiple devices.

Figure 4:
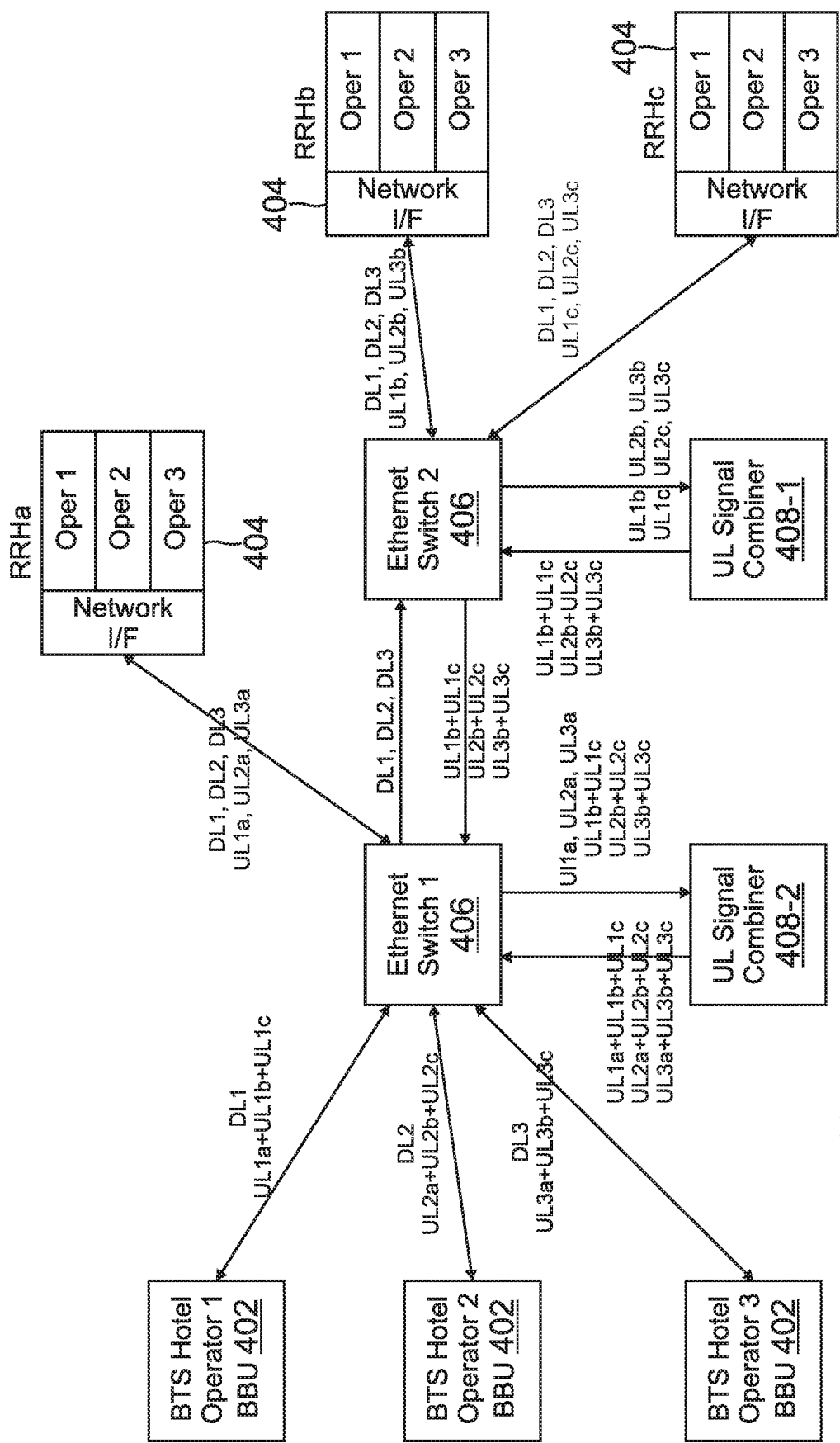
FIG. 4 depicts an example of a multistage multi-operator simulcast system.

For example, FIG. 4 depicts an example of a multistage multi-operator simulcast system 400. In the example depicted in FIG. 4, a first uplink signal combiner 408-1 generates a first composite signal from uplink traffic received from a first RRH or other remote antenna unit 404 (labeled "RRHb" in FIG. 4) and a second RRH or other remote antenna unit 404 (labeled "RRHc" in FIG. 4). A second uplink signal combiner 408-2 generates a second composite signal from the first composite signal combined with the uplink traffic from a third RRH 404 or other remote antenna unit (labeled "RRHc" in FIG. 4).

In some aspects, combining signals at earlier stages of the network can reduce bandwidth requirements in successive stages of the network. In the example depicted in FIG. 4, the six uplink streams received from RRHb and RRHc by an Ethernet switch 406 (labelled "Ethernet Switch 2" in FIG. 4) can be combined into three summed streams. The three summed streams can be transmitted from the Ethernet switch 2 to another Ethernet switch 406 (labelled "Ethernet Switch 1" I FIG. 4).

In some aspects, each of the base stations or BBUs 402 for a given operator are housed within a respective base station hotel (BTS Hotel).

Figure 5:
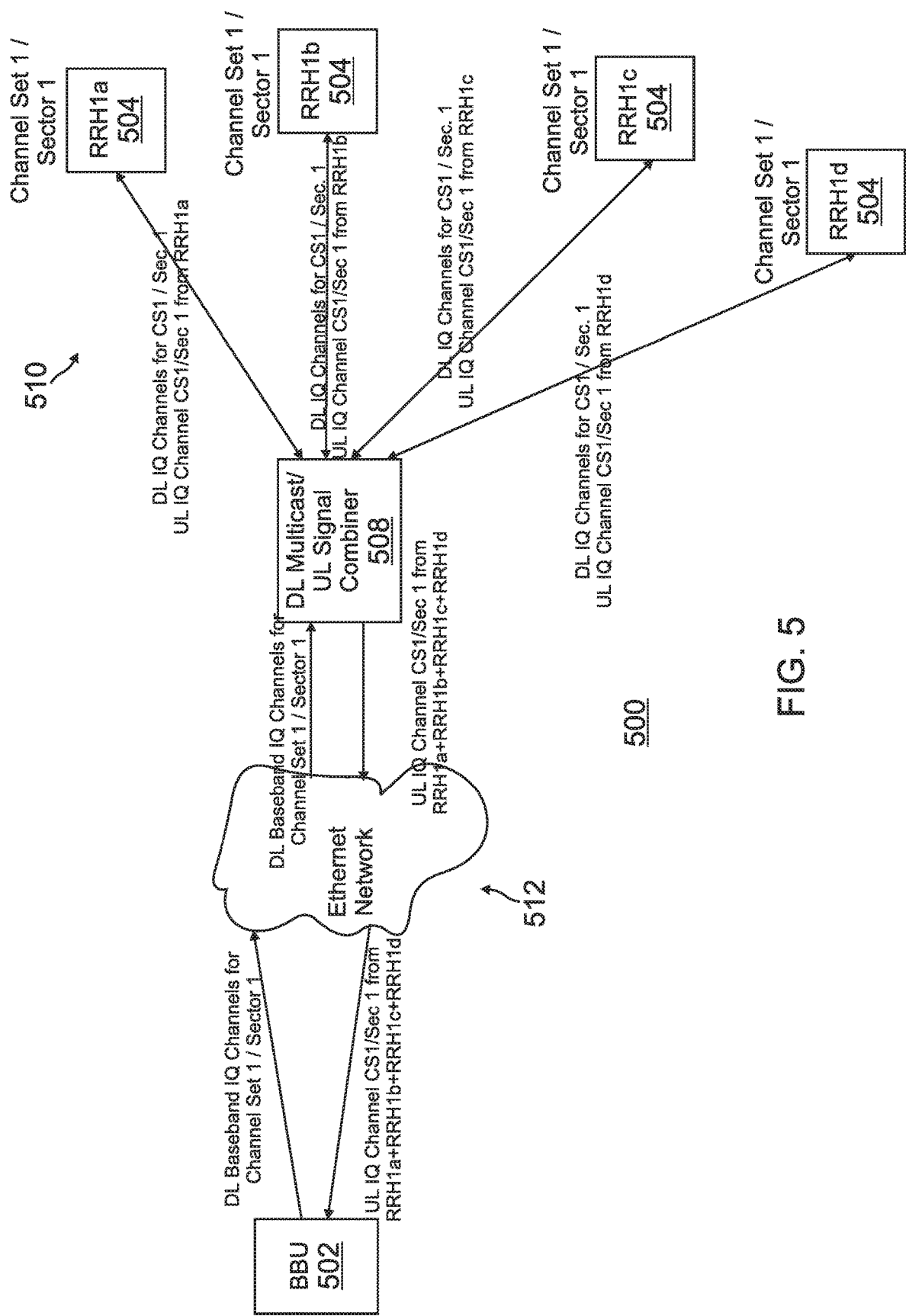
FIG. 5 depicts an example in which an uplink signal combiner is in line with multiple RRHs.

For illustrative purposes, FIGS. 1-4 depict the uplink signal combiner as a device that is peripheral to an Ethernet switch. In cases in which the uplink signal combiner is peripheral to an Ethernet switch, the uplink signal combiner can be physically co-located with the Ethernet switch. However, other implementations are possible. In some aspects, the uplink signal combiner can be positioned in-line with the RRHs. For example, FIG. 5 depicts an example of simulcast system 500 in which an uplink signal combiner 508 is in line with multiple RRHs or other remote antenna units 504. In this configuration, the uplink signal combiner 508 can be physically located near the RRHs 504. For instance, the uplink signal combiner 508 may be physically located in a building in which several RRHs 504 are served by a BBU 502. The uplink signal combiner 508 can be communicatively coupled to the RRHs 504 via a first network 510 (for example, an Ethernet local area network). The uplink signal combiner 508 can combine uplink data streams from multiple RRHs 504 and transmit the combined uplink data to the BBU 502 via a second network 512 (including, for example, wide area network or public network such as an Ethernet and/or Internet Protocol (IP) wide area network or public)). The first network 510 that couples the RRHs 504 to the uplink signal combiner 508 and the second network 512 that couples the uplink signal combiner 508 to the BBU 502 can be separate networks or the first and second networks 510 and 512 can both be a part of the same network (for example, a part of the same local area network or part of the same larger wide area network).

FIGS. 1-5 depict examples of simple network architectures. However, any number of BBUs, RRHs, Ethernet switches, uplink signal combiners, and other devices may be used. For example, hundreds of BBUs and hundreds of RRHs can be served by several uplink signal combiners located at appropriate points in an Ethernet network. In an Ethernet data network, a signal (comprising a stream of Ethernet packets) may be routed to any location in the network. For example, uplink signals can be routed from any RRH to an uplink signal combiner and on to an appropriate BBU, regardless of the location of the various devices in the network.

In additional or alternative aspects, the uplink signal combiner can handle overflow that is generated by combining uplink data into a composite signal. For example, a fixed number of bits may be assigned for each uplink channel. Summing data from these uplink channels may cause the composite digital uplink signal to exceed the number of assigned bits (i.e., cause an overflow event). Increasing the number of RRHs can increase the likelihood of such an overflow event. An uplink signal combiner can address these overflow events in any suitable manner. In some aspects, the uplink signal combiner can saturate a composite signal. In additional or alternative aspects, the uplink signal combiner can scale the outputted composite signal. In additional or alternative aspects, the uplink signal combiner can scale the input signals. The scaling can be performed based on the value of each sum or a running average of the previous sums over some window. If a large number of uplink signals are summed, a fixed scaling can be provided to reduce the noise floor rise.

In additional or alternative aspects, the uplink signal combiner can provide a muting or squelching function. The muting or squelching function can involve excluding or otherwise attenuating from the combining operation certain uplink signals received from one or more RRHs unless or if one or more conditions are or are not satisfied. An example of such a condition is an uplink signal received from a RRH being above a threshold signal level.

In some aspects, an output composite signal generated by the uplink signal combiner can use a higher number of bits than the input uplink signals. Using the higher number of bits can reduce or prevent the loss of resolution. For instance, eight 12-bit signals can be summed, and a 15 bit (or higher) sum can be sent from the uplink signal combiner to the BBU.

In additional or alternative aspects, the uplink signal combiner can time-align the uplink signals that are summed. For example, if the same mobile device transmits a signal that is received by multiple RRHs at different times and the RRHs transmit different versions of the received signal that are associated with different times of receipt, the uplink signal combiner can align the different versions of the signal in time such that the different versions of the signal received from different RRHs can be properly summed. The uplink signals can be transmitted by each RRH with a time stamp or other indicator of the time at which the signal was received by the RRH. The uplink signal combiner can receive the uplink signals from each RRH. If the uplink signals from one RRH are received substantially earlier than uplink signals from one or more other RRHs, the uplink signal combiner can buffer the uplink signals that were received earlier until the corresponding uplink signals are received from the other RRHs. In some aspects, if one or more uplink signals from a particular RRH are delayed beyond an acceptable amount of time (e.g., due to network congestion or malfunction), the uplink signal combiner can omit those signals from the sum.

In additional or alternative aspects, the uplink signal combiner can temporarily exclude at least some uplink data from a composite signal if the uplink data is received in error or otherwise unavailable. For instance, the uplink signal combiner can temporarily exclude at least some uplink data from a composite signal if an Ethernet frame that includes the uplink data is received with a cyclic redundancy check error, a length error, or some other indicator of unreliable data.

In some aspects, IQ data samples from many RRHs can be included in each Ethernet frame. The IQ samples from each RRH within each Ethernet frame can be included in any unique sum. In some aspects, at least some of the IQ samples may not be added together. For example, data for simulcast RRHs (i.e., point-to-multipoint transmission) and unicast RRHs (i.e., point-to-point transmissions) can both be included in a single Ethernet frame. The point-to-multipoint data from a given RRH can be summed or otherwise combined with point-to-multipoint data from other RRHs in a multicast set. The point-to-point IQ data can be passed through the uplink signal combiner without being combined with other uplink data.

In additional or alternative aspects, the uplink signal combiner can capture and pass through any pre-sum uplink signal in addition to the sum in which it is included. This feature can be used for diagnostics or other purposes in which a signal from a specific RRH needs to be processed separately from the sum in which it is included. For example, this feature can be performed selectively (e.g., during a diagnostic testing period).

Each uplink signal combiner can be implemented in various ways. For example, each uplink signal combiner can be implemented, at least in part, in software executing on one or more suitable programmable processors or controllers. Also, each uplink signal combiner can include one or more suitable Ethernet interface to couple the uplink signal combiner to the Ethernet network. The uplink signal combiner (or portions thereof) can be implemented in other ways (for example, using one or more field programmable gate arrays (FPGAs), one or more application specific integrated circuits (ASICs), etc.).

Figure 6:
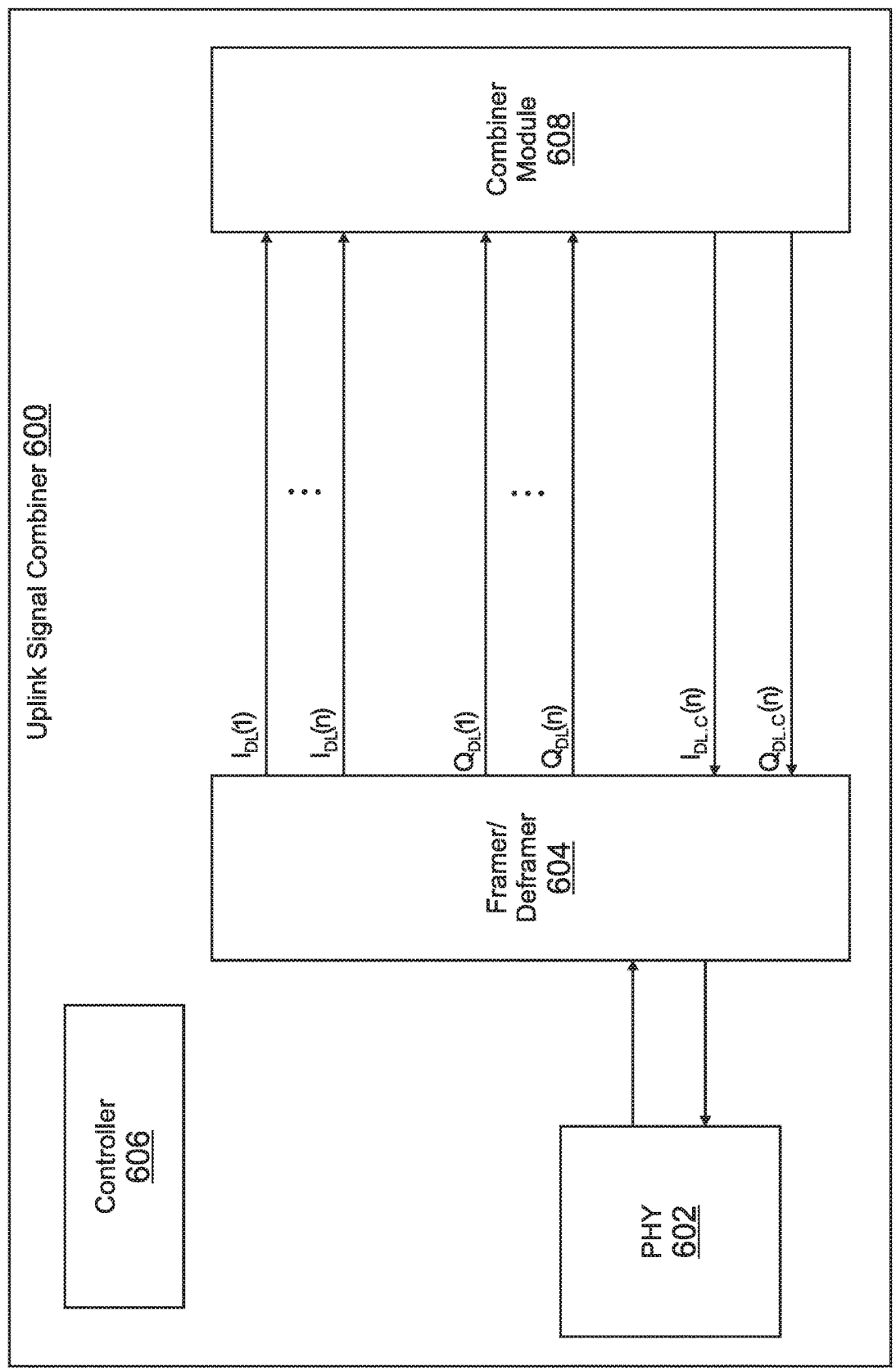
FIG. 6 depicts an example of an uplink signal combiner for combining complex digital signals.

FIG. 6 depicts an example of an uplink signal combiner 600 for combining complex digital signals. The complex digital signals include I components ($I_{DL}(1)$-$(n)$) and Q components ($Q_{DL}(1)$-$(n)$). In some aspects, $I_{DL}(1)$-$(n)$, $Q_{DL}(1)$-$(n)$ are baseband digital signals.

A PHY device 602 can provide a physical interface to the communication medium via which packetized data is received from RRHs or other remote antenna units. For example, the PHY device 602 can receive an optical signal transmitted via fiber-optic cable and convert the optical signal to an electrical signal for processing by the uplink signal combiner 600. A non-limiting example of a PHY device 602 is a digital transceiver for communicating via an Ethernet data network (that is, the PHY device 602 is an Ethernet PHY device).

The PHY device 602 can also perform one or more error correction functions. Error correction can include detecting whether errors occurred during the transmission of the data packets (e.g., by performing a cyclic redundancy check). Non-limiting examples of errors may include failing to receive one or more data packets or receiving the data packets out of order. The PHY device 602 can re-order disordered data packets.

The framer/de-framer module 604 can de-frame an Ethernet data packet and an encapsulated CPRI data packet or other data packet. De-framing can include extracting control data and user data from the data packets. The framer/de-framer module 604 can provide the control data to controller 606. The framer/de-framer module 604 can provide the user data, which may include I/Q digital data $I_{DL}(1)$-$(n)$, $Q_{DL}(1)$-$(n)$, to the combiner module 608.

The user data can represent uplink signal traffic received by multiple RRHs or other remote antenna units. The combiner module 608 can add or otherwise combine the user data to generate new user data representing a composite uplink signal. For example, different sets of I/Q digital data $I_{DL}(1)$-$(n)$, $Q_{DL}(1)$-$(n)$ received from different RRHs or other remote antenna units can be summed or otherwise combined to generate combined I/Q digital data $I_{DL,C}(n)$, $Q_{DL,C}(n)$.

The control data can include data for managing a communication link between a BBU (e.g., a base station) and a remote antenna unit (e.g., an RRH). The controller 606 can configure the framer 604 to generate one or more new data packets having the control data and the combined user data representing a combined uplink signal. For example, the framer/de-framer module 604 can frame $I_{DL,C}(n)$, $Q_{DL,C}(n)$ into data packets with a CPRI frame structure or other suitable frame structure specified by a telecommunication protocol. The framer/deframer module 604 can encapsulate the CPRI packet or other telecommunication packet within an Ethernet packet. Each data packet includes a frame having control data and a frame having user data.

Uplink signals from framer/de-framer module 604 can be transmitted to a BBU via the PHY device 602. In some aspects, the PHY device 602 can convert uplink signals to the proper format for transmission to a BBU. For example, the PHY device 602 can convert electrical signals received from framer/de-framer module 604 into optical signals for transmission over a fiber-optic cable.

While the present subject matter has been described in detail with respect to specific aspects and features thereof, it will be appreciated that those skilled in the art, upon attaining an understanding of the foregoing may readily produce alterations to, variations of, and equivalents to such aspects and features. Each of the disclosed aspects, examples, and features can be combined with one or more of the other disclosed aspects, examples, and features. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method comprising:
receiving, via a data network, first data packets that are transmitted from first remote antenna units at baseband, wherein each of the first data packets includes respective first control data and respective first user data, wherein the respective first control data include data for managing a first communication link between a first baseband unit and a respective first remote antenna unit, wherein the respective first user data represents a respective first uplink signal received by each of the first remote antenna units from one or more mobile stations, wherein the first data packets are associated with different times of receipt by the first remote antenna units;

extracting the first user data from the received first data packets;

generating first additional user data representing a first combined uplink signal by combining corresponding samples in the first user data extracted from the first data packets, wherein the corresponding samples are samples from different remote antenna units in the first remote antenna units that are from a transmission from a mobile station in the one or more mobile stations received by the different remote antenna units;

checking if the first additional user data causes an overflow event, wherein the overflow event occurs when a number of bits in the first combined uplink signal exceeds a number of assigned bits for the first communication link;

addressing the overflow event within the first additional user data; and transmitting a first additional data packet to the first baseband unit, wherein the first additional data packet includes the first additional user data and first additional control data derived from the first control data from the received first data packets.

2. The method of claim 1, wherein each of the first data packets received from the first remote antenna units comprises a respective Ethernet packet having respective Ethernet control data and respective Ethernet payload data, wherein the respective Ethernet payload data includes the respective first control data for managing the first communication link and the respective first user data representing the first uplink signal, wherein the first additional data packet comprises an additional Ethernet packet addressed to the first baseband unit.

3. The method of claim 1, wherein the first data packets received from the first remote antenna units comprises Ethernet data packets encapsulating data packets formatted according to at least one of the following protocols: a Common Public Radio Interface ("CPRI") protocol, an Open Radio Equipment Interface ("ORI") protocol, an Open Base Station Standard Initiative ("OBSAI") protocol, and a proprietary protocol.

4. The method of claim 1, wherein the respective first user data comprises respective digital samples indicative of the respective first uplink signal received by each of the first remote antenna units from the one or more mobile stations;
wherein generating the first additional user data representing the first combined uplink signal by combining the first user data extracted from the first data packets comprises digitally combining corresponding digital samples received from two or more of the first remote antenna units.

5. The method of claim 4, wherein the digital samples comprise digital in-phase and quadrature (IQ) samples.

6. The method of claim 1, wherein combining the first user data extracted from the first data packets comprises adding corresponding first user data received from two or more of the first remote antenna units.

7. The method of claim 1, wherein combining the first user data extracted from the first data packets comprises using a muting or squelching function that excludes or attenuates first user data from one of the first remote antenna units as a function of whether or not a condition is satisfied.

8. The method of claim 1, wherein the first additional user data represents the first combined uplink signal using more bits than are used by the first user data received from the first remote antenna units to represent the first uplink signals received by the first remote antenna units.

9. The method of claim 1, further comprising time aligning the first user data extracted from the first data packets prior to generating the first additional user data.

10. The method of claim 1, further comprising scaling at least one of:
the first user data extracted from the first data packets prior to generating the first additional user data; and
the first additional user data.

11. The method of claim 1, further comprising:
receiving, via the data network, second data packets from the first remote antenna units, wherein each of the second data packets includes respective second control data and respective second user data, wherein the respective second control data include data for managing a second communication link between a second baseband unit and a respective first remote antenna unit, wherein the respective second user data represents a respective second uplink signal received by each of the first remote antenna units from one or more mobile stations;
extracting the second user data from the received second data packets;
generating second additional user data representing a second combined uplink signal by combining the second user data extracted from the second data packets; and
transmitting a second additional data packet to the second baseband unit, wherein the second additional data packet includes the second additional user data and second additional control data derived from the second control data from the received second data packets.

12. The method of claim 1, wherein the first data packets are received at a first uplink signal combiner and wherein the method further comprises:
receiving, at a second uplink signal combiner via the data network, second data packets from second remote antenna units, wherein each of the second data packets includes respective second control data and respective second user data, wherein the respective second control data include data for managing a respective second communication link between the first baseband unit and a respective second remote antenna unit, wherein the respective second user data represents a respective first uplink signal received by each of the second remote antenna units from one or more mobile stations;
extracting, at the second uplink combiner, the second user data from the received second data packets;
generating, at the second uplink combiner, second additional user data representing a second combined uplink signal by combining the second user data extracted from the second data packets;
transmitting, from the second uplink combiner, a second additional data packet to the first uplink combiner, wherein the second additional data packet includes the second additional user data and second additional control data derived from the second control data from the received second data packets;
receiving, at the first uplink combiner, the second additional data packet; and
extracting the second additional user data from the second additional data packet;
wherein generating the first additional user data further comprises combining the first user data extracted from the first data packets and the second additional user data extracted from the second additional data packet.

13. The method of claim 1, wherein the method is performed using an uplink signal combiner that is in-line with the first remote antenna units.

14. An uplink signal combiner for use with multiple first remote radio heads and a first baseband unit, the uplink signal combiner comprising:
at least one network interface to couple the uplink signal combiner to a data network in order to couple the uplink signal combiner to the first baseband unit and the first remote radio heads;
wherein the uplink signal combiner is configured to:
receive, via the data network, first data packets that are transmitted from the first remote radio heads at baseband, wherein each of the first data packets includes respective first control data and respective first user data, wherein the respective first control data include data for managing a first communication link between a first baseband unit and a respective first remote radio head, wherein the respective first user data represents a respective first uplink signal received by each of the first remote radio heads from one or more mobile stations, wherein the first data packets are associated with different times of receipt by the first remote radio heads;
extract the first user data from the received first data packets;
generate first additional user data representing a first combined uplink signal by combining corresponding samples in the first user data extracted from the first data packets, wherein the corresponding samples are samples from different remote radio heads in the first remote radio heads that are part of an original transmission from a mobile station in the one or more mobile stations received by the different remote radio heads;

checking if the first additional user data causes an overflow event, wherein the overflow event occurs when a number of bits in the first combined uplink signal exceeds a number of assigned bits for the first communication link;

addressing the overflow event within the first additional user data; and transmit a first additional data packet to the first baseband unit, wherein the first additional data packet includes the first additional user data and first additional control data derived from the first control data from the received first data packets.

15. The uplink signal combiner of claim 14, wherein the network interface comprises an Ethernet network interface;

wherein each of the first data packets received from the first remote radio heads comprises a respective Ethernet packet having respective Ethernet control data and respective Ethernet payload data, wherein the respective Ethernet payload data includes the respective first control data for managing the first communication link and the respective first user data representing the first uplink signal, wherein the first additional data packet comprises an additional Ethernet packet addressed to the first baseband unit.

16. The uplink signal combiner of claim 14, wherein the first data packets received from the first remote radio heads comprises Ethernet data packets encapsulating data packets formatted according to at least one of the following protocols: a Common Public Radio Interface ("CPRI") protocol, an Open Radio Equipment Interface ("ORI") protocol, an Open Base Station Standard Initiative ("OBSAI") protocol, and a proprietary protocol.

17. The uplink signal combiner of claim 14, wherein the respective first user data comprises respective digital samples indicative of the respective first uplink signal received by each of the first remote radio heads from the one or more mobile stations;

wherein the uplink signal combiner is configured to generate the first additional user data representing the first combined uplink signal by digitally combining corresponding digital samples received from two or more of the first remote radio heads.

18. The uplink signal combiner of claim 17, wherein the digital samples comprise digital in-phase and quadrature (IQ) samples.

19. The uplink signal combiner of claim 14, wherein the uplink signal combiner is configured to combine the first user data extracted from the first data packets by adding corresponding first user data received from two or more of the first remote radio heads.

20. The uplink signal combiner of claim 14, wherein the uplink signal combiner is configured to combine the first user data extracted from the first data packets by using a muting or squelching function that excludes or attenuates first user data from one of the first remote radio heads as a function of whether or not a condition is satisfied.

21. The uplink signal combiner of claim 14, wherein the uplink signal combiner is configured to generate the first additional user data using more bits to represent the first combined uplink signal than are used by the first user data received from the first remote radio heads to represent the first uplink signals received by the first remote radio heads.

22. The uplink signal combiner of claim 14, wherein the uplink signal combiner is further configured to time align the first user data extracted from the first data packets prior to generating the first additional user data.

23. The uplink signal combiner of claim 14, wherein the uplink signal combiner is further configured to scale at least one of:

the first user data extracted from the first data packets prior to generating the first additional user data; and the first additional user data.

24. The uplink signal combiner of claim 14, wherein the uplink signal combiner is further configured to:

receive, via the data network, second data packets from the first remote radio heads, wherein each of the second data packets includes respective second control data and respective second user data, wherein the respective second control data include data for managing a second communication link between a second baseband unit and a respective first remote radio head, wherein the respective second user data represents a respective second uplink signal received by each of the first remote radio heads from one or more mobile stations;

extract the second user data from the received second data packets;

generate second additional user data representing a second combined uplink signal by combining the second user data extracted from the second data packets; and transmit a second additional data packet to the second baseband unit, wherein the second additional data packet includes the second additional user data and second additional control data derived from the second control data from the received second data packets.

25. The uplink signal combiner of claim 14, wherein a second uplink combiner receives via the data network, second data packets from second remote radio heads, wherein each of the second data packets includes respective second control data and respective second user data, wherein the respective second control data include data for managing a respective second communication link between the first baseband unit and a respective second remote radio head, wherein the respective second user data represents a respective first uplink signal received by each of the second remote radio heads from one or more mobile stations;

wherein the second uplink signal combiner extracts the second user data from the received second data packets;

wherein the second uplink signal combiner generates second additional user data representing a second combined uplink signal by combining the second user data extracted from the second data packets;

wherein the second uplink signal combiner transmits a second additional data packet to the first uplink combiner, wherein the second additional data packet includes the second additional user data and second additional control data derived from the second control data from the received second data packets; and wherein the second uplink signal combiner is configured to:

receive the second additional data packet;

extract the second additional user data from the second additional data packet; and generate the first additional user data by combining the first user data extracted from the first data packets and the second additional user data extracted from the second additional data packet.

26. The uplink signal combiner of claim 14, wherein the uplink signal combiner is configured to be used in-line with the first remote radio heads.

27. A system comprising:
an uplink signal combiner; and
a plurality of first remote antenna units configured to communicate with a first baseband unit;
wherein the uplink signal combiner comprises:
- at least one network interface to couple the uplink signal combiner to a data network in order to couple the uplink signal combiner to the first baseband unit and the first remote antenna units;

wherein the uplink signal combiner is configured to:
- receive, via the data network, first data packets that are transmitted from the first remote antenna units at baseband, wherein each of the first data packets includes respective first control data and respective first user data, wherein the respective first control data include data for managing a first communication link between a first baseband unit and a respective first remote antenna unit, wherein the respective first user data represents a respective first uplink signal received by each of the first remote antenna units from one or more mobile stations, wherein the first data packets are associated with different times of receipt by the first remote antenna units;
- extract the first user data from the received first data packets;
- generate first additional user data representing a first combined uplink signal by combining corresponding samples in the first user data extracted from the first data packets, wherein the corresponding samples are samples from different remote antenna units in the first remote antenna units that are part of an original transmission from a mobile station in the one or more mobile stations received by the different remote antenna units;
- check if the first additional user data causes an overflow event, wherein the overflow event occurs when a number of bits in the first combined uplink signal exceeds a number of assigned bits for the first communication link;
- address the overflow event with the first additional user data; and
- transmit a first additional data packet to the first baseband unit, wherein the first additional data packet includes the first additional user data and first additional control data derived from the first control data from the received first data packets.

28. The system of claim 27, wherein the network interface of the uplink signal combiner comprises an Ethernet network interface;
wherein each of the first data packets received from the first remote antenna units comprises a respective Ethernet packet having respective Ethernet control data and respective Ethernet payload data, wherein the respective Ethernet payload data includes the respective first control data for managing the first communication link and the respective first user data representing the first uplink signal, wherein the first additional data packet comprises an additional Ethernet packet addressed to the first baseband unit.

29. The system of claim 27, wherein the first data packets received from the first remote antenna units comprises Ethernet data packets encapsulating data packets formatted according to at least one of the following protocols: a Common Public Radio Interface ("CPRI") protocol, an Open Radio Equipment Interface ("ORI") protocol, an Open Base Station Standard Initiative ("OBSAI") protocol, and a proprietary protocol.

30. The system of claim 27, wherein the respective first user data comprises respective digital samples indicative of the respective first uplink signal received by each of the first remote antenna units from the one or more mobile stations;
wherein the uplink signal combiner is configured to generate the first additional user data representing the first combined uplink signal by digitally combining corresponding digital samples received from two or more of the first remote antenna units.

31. The system of claim 27, wherein the uplink signal combiner is configured to combine the first user data extracted from the first data packets by adding corresponding first user data received from two or more of the first remote antenna units.

* * * * *